US010566635B2

(12) United States Patent
Metkemeijer et al.

(10) Patent No.: US 10,566,635 B2
(45) Date of Patent: Feb. 18, 2020

(54) PURGE CIRCUIT OF A FUEL CELL

(71) Applicants: SymbioFCell, Grenoble (FR);
Association pour la Recherche et le Développement des Méthodes et Processus Industriels, Paris (FR)

(72) Inventors: Rudolf Metkemeijer, Peymeinade (FR); Benjamin De Grisard, Antibes (FR); Patrick Leroux, Le Cannet (FR); Patrick Achard, Le Plan de Grasse (FR)

(73) Assignees: SYMBIOFCELL, Grenoble (FR); ASSOCIATION POUR LA RECHERCHE ET LE DEVELOPPEMENT DES METHODES ET PROCESSUS INDUSTRIELS, Paris (FR)

( * ) Notice: Subject to any disclaimer, the term of this patent is extended or adjusted under 35 U.S.C. 154(b) by 349 days.

(21) Appl. No.: 15/117,842

(22) PCT Filed: Feb. 10, 2015

(86) PCT No.: PCT/EP2015/052687
§ 371 (c)(1),
(2) Date: Aug. 10, 2016

(87) PCT Pub. No.: WO2015/118161
PCT Pub. Date: Aug. 13, 2015

(65) Prior Publication Data
US 2017/0012306 A1      Jan. 12, 2017

(30) Foreign Application Priority Data
Feb. 10, 2014   (FR) ...................................... 14 50986

(51) Int. Cl.
*H01M 8/04089*    (2016.01)
*H01M 8/04119*    (2016.01)
(Continued)

(52) U.S. Cl.
CPC ... *H01M 8/04097* (2013.01); *H01M 8/04179* (2013.01); *H01M 8/04231* (2013.01); *H01M 8/04402* (2013.01); *H01M 8/04753* (2013.01)

(58) Field of Classification Search
CPC ............... H01M 8/04; H01M 8/04089; H01M 8/04223; H01M 8/04746; H01M 8/0438;
(Continued)

(56) References Cited

U.S. PATENT DOCUMENTS

2009/0075128 A1   3/2009   Sadamoto

FOREIGN PATENT DOCUMENTS

EP    1 018 774 A1    7/2000
EP    1018774 A1 *    7/2000    ........ H01M 8/04223
(Continued)

OTHER PUBLICATIONS

Search Report issued in French Patent Application No. FR 14 50986 dated Nov. 13, 2014.
(Continued)

*Primary Examiner* — Karie O'Neill Apicella
(74) *Attorney, Agent, or Firm* — Pearne & Gordon LLP (57) ABSTRACT

A purging circuit for purging an anodic compartment of a cell of a fuel cell, this circuit including:
a capacity, forming a related volume at least equal to 500 ml, for containing and homogenising a recovery gas, including an inlet and an outlet; a first nonreturn valve to prevent the recovery gas from returning through the outlet and allowing gas to flow from the first outlet to an inlet of the compartment;

(Continued)

a second nonreturn valve to prevent gas from being discharged from the capacity through the inlet;
a pressure sensor able to measure the pressure of a fluid present in the circuit;
a valve controlling the flow of a supply gas to and from the compartment as a function of data of the sensor and allowing gas to flow from the first nonreturn valve to the inlet of the compartment.

18 Claims, 5 Drawing Sheets

(51) Int. Cl.
 *H01M 8/04223* (2016.01)
 *H01M 8/0438* (2016.01)
 *H01M 8/04746* (2016.01)
(58) Field of Classification Search
 CPC ......... H01M 8/04119; H01M 8/04097; H01M 8/04402; H01M 8/04179; H01M 8/04753; H01M 8/04231
 See application file for complete search history.

(56) References Cited

FOREIGN PATENT DOCUMENTS

| FR | 2 826 782 A1 | 1/2003 | |
|----|----|----|----|
| JP | 2007-042452 A | 2/2007 | |
| JP | 2010-232167 A | 10/2010 | |
| JP | 2010232167 A * | 10/2010 | .............. H01M 8/04 |
| JP | 2011-023228 A | 2/2011 | |
| JP | 2011-113859 A | 6/2011 | |

OTHER PUBLICATIONS

International Preliminary Report on Patentability issued in Application No. PCT/EP2015/052687 dated Apr. 6, 2016.
International Search Report issued in Application No. PCT/EP2015/052687 dated May 6, 2015.
Written Opinion issued in Application No. PCT/EP2015/052687 dated May 6, 2015.

* cited by examiner

PURGE CIRCUIT OF A FUEL CELL

TECHNICAL FIELD AND PRIOR ART

The present application relates to the technical field of fuel cells, more precisely, a device allowing at least one compartment belonging to a fuel cell to be supplied and purged.

A fuel cell is a converter of chemical energy into electrical energy, of a simple use and suitable for numerous economic sectors, such as the transportation sector (land, air, water or river vehicles), or the dwelling sector (extra power generator for residences).

Figure 1:
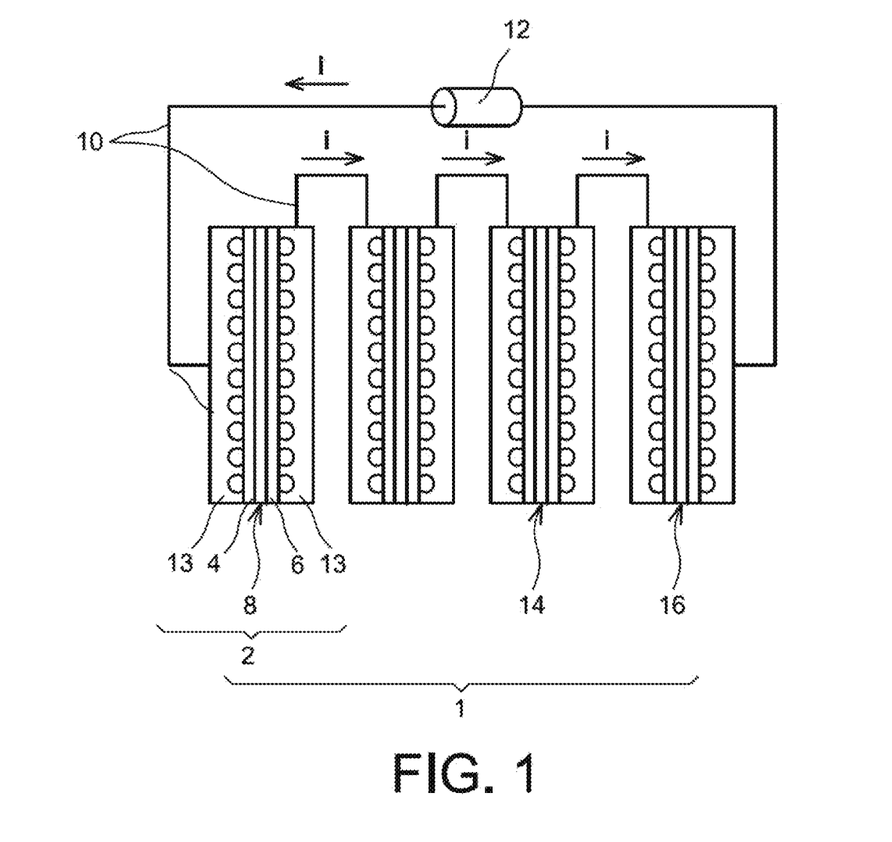
FIG. 1 represents a cross-section view of a fuel cell comprising several electrochemical cells.

A fuel cell 1 includes at least one electrochemical cell 2 comprising an anode 4 separated from a cathode 6 by an electrolyte 8 (FIG. 1). The electrochemical cell is supplied with two different gases, the first can for example be hydrogen, oxidising in contact with the anode, the second be oxygen reduced in contact with the cathode according to the following electrochemical reactions:

$$H_2 \rightarrow 2H^+ + 2e^- \quad \text{Equation 1}$$

$$\frac{1}{2}O_2 + 2H^+ + 2e^- \rightarrow H_2O. \quad \text{Equation 2}$$

The fuel cells consuming hydrogen are also called hydrogen cells. The electrolyte 8, also called a membrane, enables fuels introduced into the electrochemical cell 2 to be separated, while allowing hydrogen ions produced at the anode to be flown to the cathode. The oxidation of hydrogen produces electrons flowing from the anode to the cathode via an electrical circuit 10 external to the cell 2, such that a client environment 12 connected to the electrical circuit 10 can consume electricity produced by the cell. The membrane 8 is made of a porous electrically insulating, but ion conducting material (for example from PTFE). The reactants are introduced to the electrodes through supply channels specific to each electrode and present in bipolar plates 13 delimiting the electrochemical cell 2. The supply channels also enable the product of the electrochemical reactions above to be discharged. The volume delimited by a supply channel and an electrode forms an anodic compartment 14 when the electrode is the anode, or a cathodic compartment 16 when the electrode is the cathode (FIG. 1).

A hydrogen electrochemical cell 2 theoretically provides an electrical voltage of 1.23V. In practice, the electrical voltage ranges from 0.9 V in open circuit to 0.65 V for a current density ranging from 0.7 to 1.5 A/cm². The electrical voltage varies in particular as a function of the partial pressure of the fluids transporting fuels into the anodic and cathodic compartments. In order to obtain electrical voltages operable for the abovementioned uses, several electrochemical cells 2 are assembled in series to form an assembly, also called a "stack". An electrochemical cell can thus include several electrochemical cells, supplied from a same supply channel serving several cathodic or anodic compartments.

The oxygen consumed by hydrogen cells is generally taken from the environment of the cell, whereas the hydrogen has to be stored in an appropriate tank. Hence, the autonomy of a hydrogen cell mainly depends on its hydrogen consumption and the storage tank capacity. Thereby, it appears essential to optimise this consumption to increase the cell autonomy and efficiency. The performance of a hydrogen electrochemical cell also depends on the moisture content of the membrane 8: this moisture allows a good ion conduction of hydrogen ions through the membrane. But too high a moisture content is likely to promote the formation of a liquid film at the surface of the electrodes, preventing the above electrochemical reactions from occurring. In other words, too high a moisture content, in particular in the anodic compartment, degrades the performance of the electrochemical cell. Consequently, it is necessary to purge the supply channel to lower the moisture content.

The performance of an electrochemical cell is also degraded by the presence and stagnation of inert gases in the anodic compartment 14. For example, nitrogen present in ambient air led to the cathodic compartment to provide oxygen to the reaction can diffuse through the membrane 8, from the cathodic compartment 16 to the anodic compartment. Thus, there is a risk of inert gas built up in the anodic compartment which is likely to restrict the yield of the electrochemical reaction of the above equation 1.

In other words, an excess moisture and too high a concentration of inert gases at the anodic compartment degrade the performance and autonomy of the electrochemical cell.

To prevent these drawbacks, the anodic compartment can be regularly purged. Liquid state water and inert gases present in the compartment are for example discharged from the electrochemical cell by abruptly varying the hydrogen flow rate in the cell.

Figure 2:
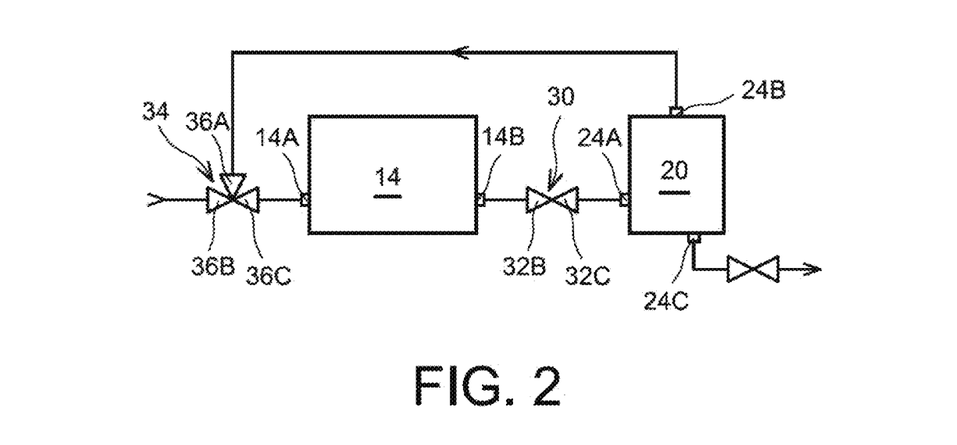
FIG. 2 represents FIG. 7 of document EP1018774A1.

Document EP1018774A1 discloses several examples of purging methods based on this principle. In particular, a device for purging an anodic compartment 14 of a hydrogen cell comprising a capacity 20 an inlet 24A of which is connected through an outlet valve 30 with two ways (32A, 32B) to an outlet 14B of the anodic compartment 14 (FIG. 2). The capacity 20 enables the gases and liquid state water outflowing from the anodic compartment to be stored. An outlet 24B of the capacity is connected to a first inlet 36A of a three-way inlet valve 34, the second inlet 36B of the valve is connected to a hydrogen supply circuit and its outlet 36C is connected to the input 14A of the anodic compartment 14. Upon operating the cell, the inlet valve 34 is positioned so as to connect the anodic compartment 14 to a hydrogen supply circuit, the outlet valve 30 is in the open position to enable gases and water to be discharged from the anodic compartment to the capacity 20. When the anodic compartment 14 is desired to be purged, a first step consists in inverting the position of the inlet valve 34 so as to connect the input 14A of the anodic compartment to the output 24B of the capacity 20. Upon operating, the hydrogen cell consumes the hydrogen present in the capacity 20, causing a pressure drop in the same. When the pressure in the capacity lowers below a threshold value, the outlet valve 30 is actuated according to a second step, so as to isolate the outlet 14B of the anodic compartment 14 of the inlet 24A of the capacity 20. During a third step, the position of the inlet valve 34 is again modified to connect the hydrogen supply circuit to the inlet 14A of the anodic compartment, in order to increase the pressure in the same. The fourth step enabling the anodic compartment to be purged consists in opening the outlet valve 30, in order to create an abrupt depressurisation of the anodic compartment 14. The pressure drop in the anodic compartment creates a rapidly growing gas current enabling the water and gas present in this compartment to be discharged into the capacity 20. According to a fifth and last step, the outlet valve 30 is closed.

This purging device requires the use of two valves that have to be actuated by a user or a control device, synchronously, so as to enable a sufficient pressure differential between the anodic compartment 14 and the capacity 20 to be set to perform the purging. The synchronisation of the valves changes over time as a function of their intrinsic characteristics, in particular as a function of the response time of each valve which is likely to be degraded upon use. Hence, it is necessary to perform regular checks of the purging device and to correct the synchronisation of the valves to enable this device type to be optimally used. Furthermore, the use of valves having different designs increases the manufacturing cost and complicates the maintenance of such a device.

The present application aims at providing a device for purging a fuel cell enabling at least one of the abovementioned problems to be solved. More precisely, one object of the invention is to offer means enabling the anodic compartment of a fuel cell to be homogeneously purged, in a more efficient, more reliable and simpler manner.

DISCLOSURE OF THE INVENTION

The present application aims at solving at least one of the abovementioned technical problems, with a purging circuit for purging an anodic compartment of an electrochemical cell of a fuel cell, this circuit including:
  means for containing a recovery gas, comprising a first inlet and a first outlet;
  a first nonreturn valve connected to the first outlet of the means for containing a recovery gas so as to prevent a gas from being introduced into these means through the first outlet;
  a second nonreturn valve connected to the first inlet of the means for containing a recovery gas, so as to prevent a gas from being discharged through the first inlet, from these means;
  a pressure sensor able to measure the pressure of a fluid present in said circuit;
  means allowing a gas to be flown or prohibiting it from being flown to the inlet of said compartment, as a function of pressure data from said pressure sensor.

The means for containing a recovery gas include a capacity or a tank able to store a fluid. The means for containing a recovery gas enable the same to be homogenised, and thus to make a mixture of hydrogen with inert gases, such as nitrogen. The latter, which is then reinjected into the anodic compartment, is less harmful, for the operation of the cell, after being mixed with hydrogen. This homogeneous nitrogen and hydrogen mixture enables the presence of a zone not supplied with hydrogen to be avoided due to a hydrogen/neutral gases stratification implying an irreversible degradation of the electrochemical cells. This further enables hydrogen not to be released in the environment: releasing nitrogen (or any other neutral gas) would also imply unavoidably releasing hydrogen.

The fluid storage capacity (in other words: the internal volume of the means for containing a recovery gas) can for example be at least equal to 300 ml or 500 ml, for example between 500 ml and 22 l, further preferably between 500 ml and 5 l or between 500 ml and 2 l, for example 1 l or 2 l. Preferably, the first inlet and the first outlet of the means for containing a recovery gas are located in a so-called upper part of these means, such that they can contain a liquid in a so-called lower part and a gas in a so-called upper part, and that the first inlet and the first outlet enable a gas to be flown through these means, while having the liquid therein.

The term "connected" designates any so-called connecting means, enabling a fluid to be flown between two devices connected together. These connecting means, can for example be a channel, or several channels, the inner walls of which are fluid proof. But the abovementioned hydrogen and inert gases mixture is only efficiently made in the means for containing a recovery gas (the capacity or tank), and not in the connecting means. The abovementioned volume, between 500 ml and 22 l, does not include the internal volume of these connecting means, which connect, on the one hand the means for containing a recovery gas and, on the other hand, both valves. In other words, the inner volume of the means for containing a recovery gas is monolithic or single piece, or even a volume having connexity, and not divided into volumes separated on either side of a liquid-gas separator. These means form a single or even monolithic or single piece volume to mix the gases which outflow from the anodic compartment.

The pressure measured in the circuit will change over time as a function of the volume of gas stored in the means for containing a recovery gas. Consequently, the activation, or opening and closing of the means allowing a gas to be flown or prohibiting it from being flown to the inlet of said compartment (which can also be called opening and closing means), will depend on the change over time of this volume of stored gas. The higher the volume of liquid stored in the storage means, the higher the activation rate of the opening and closing means (and the shorter the purging cycle of the anodic compartment). The lesser the volume of liquid stored in the storage means, the lesser the activation rate of the opening and closing means (and the longer the purging cycle of the anodic compartment).

The nonreturn valves allow a fluid to be flown in the purging circuit along a single flow direction.

They can have a chosen minimum set pressure—for example 50 mbar—to use at best the pressure variations allowed by a membrane separating the anodic compartment from a cathodic compartment belonging to a same electrochemical cell. Indeed, too wide a variation of the differential pressure depending on the variation amplitude and the pressure of the recovery volume can mechanically degrade the membrane of the electrochemical cells integrated to the fuel cell.

According to one embodiment, the pressure sensor can be connected upstream of the second valve, so as to measure the pressure of a fluid flowing or able to flow through the second valve. In other words, the pressure sensor can measure the pressure of a fluid present in a channel connected upstream of the second valve. The terms upstream and downstream designate the flow direction of a fluid through the second nonreturn valve.

The means allowing a gas to be flown to the input of said compartment can include a very quick opening valve, for example a solenoid valve, having an inlet and an outlet. Such a valve can be opened within 0.1 s, or less.

Such a purging circuit can further include a connector, for example a connector with three branches or more, including a first branch connected to the first nonreturn valve, a second branch and a third branch, said means allowing a gas to be flown to the input of said compartment being connected to the third branch of the connector.

In a purging circuit according to the invention, an outlet of said anodic compartment can be connected to the pressure sensor.

An inlet of said anodic compartment can be connected to the second branch of the connector, preferably so as to allow a fluid outflowing from the anodic compartment to be reintroduced into said compartment through the purging circuit.

Preferably, the means allowing a gas to be flown or prohibiting it from being flown to the input of said compartment:

allow a gas to be flown to the input of said compartment, when the pressure sensor measures a pressure lower than a minimum threshold (VA), do not allow a gas to be flown to the input of said compartment, when the pressure sensor measures a pressure higher than a maximum threshold (VB), which is higher than the minimum threshold pressure (VA).

Further preferably, these means allowing or prohibiting a gas to be flown to the input of said compartment:

allow a gas to be flown to the input of said compartment and remain open (and thus allow the gas to be flown) when an increase in the pressure is intended, do not allow a gas to be flown to the input of said compartment (and thus prohibit the gas from being flown) when a drop in the pressure is intended.

In such a purging circuit, a pressure reducer can be connected upstream of the means allowing a gas to be flown or prohibiting it from being flown to the input of said compartment, for example between a pressurised fuel supply device and an input of said means.

The means for containing a recovery gas can include a second aperture for discharging at least part of the liquid state water present in the capacitor.

Means for measuring the liquid water volume present in said means for containing a recovery gas can further be provided.

Means for controlling said second aperture can also be provided, for example as a function of said measurement of the liquid water volume. They include for example a valve, further for example a solenoid valve.

In such a purging circuit, means can be provided to measure the frequency of purging cycles and to control the operation of said means for controlling said second aperture as a function of this frequency. Such means can include for example a tachometer enabling the frequency of the opening and closing cycle of the means for supplying the compartment to be measured.

According to one embodiment, said means for controlling said second aperture enable this to be controlled without releasing a recovery gas into the environment.

A second pressure sensor can be provided for measuring the pressure in a cathodic compartment belonging to the same electrochemical cell as said anodic compartment.

The means allowing a gas to be flown or prohibiting it from being flown to the input of said compartment, as a function of pressure data from said pressure sensor, can be controlled as a function of the pressure difference between both these compartments.

A purging circuit according to the invention can connect several outlets and several inlets of several anodic compartments belonging to a fuel cell comprising several electrochemical cells.

A purging circuit according to the invention can further include a pressurised fuel supply device comprising hydrogen, connected to an inlet of the means allowing a gas to be flown or prohibiting it from being flown to the input of said compartment.

Another aspect of the invention also relates to a method for operating a circuit as described above, including:

measuring the pressure of a fluid present in said circuit, for example upstream of the second nonreturn valve;

flowing a gas to the inlet of said compartment, as a function of pressure data of said pressure sensor.

As already explained above, there is, in the means for containing a recovery gas, a mixture or a homogenisation of the hydrogen and inert gases, such as nitrogen, which outflow from the anodic compartment. All these gases can thus be reinjected into the anodic compartment, and the inert gases, in particular nitrogen, are thereby less harmful, for the operation of the fuel cell, after being mixed with hydrogen. This enables the hydrogen not to be released into the environment: releasing nitrogen would also imply unavoidably releasing hydrogen.

The pressure measured in the circuit will change over time as a function of the volume of gas stored in the means for containing a recovery gas. Consequently, the flow (or the interruption thereof) of gas to the input of the anodic compartment will depend on the change over time of this volume of stored gas. The higher the volume of liquid stored in the storage means, the higher the rate of this flow (or the rate of its beginning and its end) (and the shorter the purging cycle of the anodic compartment). The lesser the volume of liquid stored in the storage means, the lesser the rate of this flow (or the rate of its beginning and its end) (and the longer the purging cycle of the anodic compartment). The compartment can be supplied with recovery gas when the pressure difference between the means for containing this recovery gas (the gas contained in these means is called a recovery gas), and said anodic compartment is higher than the set pressure of the first nonreturn valve.

Depending on the position of the pressure sensor, for example when the pressure in the compartment and in the means for containing this recovery gas comes below a so-called minimum pressure value, for example that defined above, the means allowing a gas to be flown to the input of said compartment can be open.

The opening of the means allowing a gas to be flown to the input of said compartment is very quick, for example of a duration between 0.1 and 0.5 s.

A pressure front is caused by opening the means allowing a gas to be flown to the input of said compartment, for example for a duration between 5 s and 15 s.

The pressure front caused by opening the means allowing a gas to be flown to the input of said compartment can enable the first nonreturn valve to be closed, thus fluidically isolating the means for containing a recovery gas from the input of the anodic compartment.

This pressure front can also enable the opening of the second nonreturn valve to be triggered.

Advantageously, this pressure front enables water and the gases present in the anodic compartment to be discharged towards the means for containing the recovery gas.

When the pressure difference between the means for containing this recovery gas and the anodic compartment reaches the set pressure of the second nonreturn valve, this can be closed so as to prevent elements present in the means for containing the recovery gas from migrating to the anodic compartment.

In other words, when the pressure difference between the anodic compartment and the means for containing the recovery gas tends to the set pressure of the second nonreturn valve, this closes.

The means for containing the recovery gas and the anodic compartment are filled with hydrogen until the pressure detected by the pressure sensor is higher than the predetermined pressure threshold, called a maximum pressure VB. Beyond this value, the pressure sensor controls closing the means prohibiting a gas from being flown to the input of said compartment.

BRIEF DESCRIPTION OF THE DRAWINGS

Further details and characteristics of the invention will appear upon reading the description that follows, made in reference to the following appended figures. Identical, similar or equivalent parts of the different figures bear the same reference numerals so as to facilitate switching from one figure to the other. Different parts represented in the figures are not necessarily drawn at a uniform scale, to make the figures more legible.

DETAILED DISCLOSURE OF PARTICULAR EMBODIMENTS

The present application aims at providing a purging device enabling an anodic compartment of a hydrogen cell to be purged, in a more efficient, simpler and more reliable manner. An exemplary embodiment of such a device, with several alternatives added thereto, is described below.

The elements making up a hydrogen cell have been described above, the references mentioned herein below correspond to this description.

Figure 3:
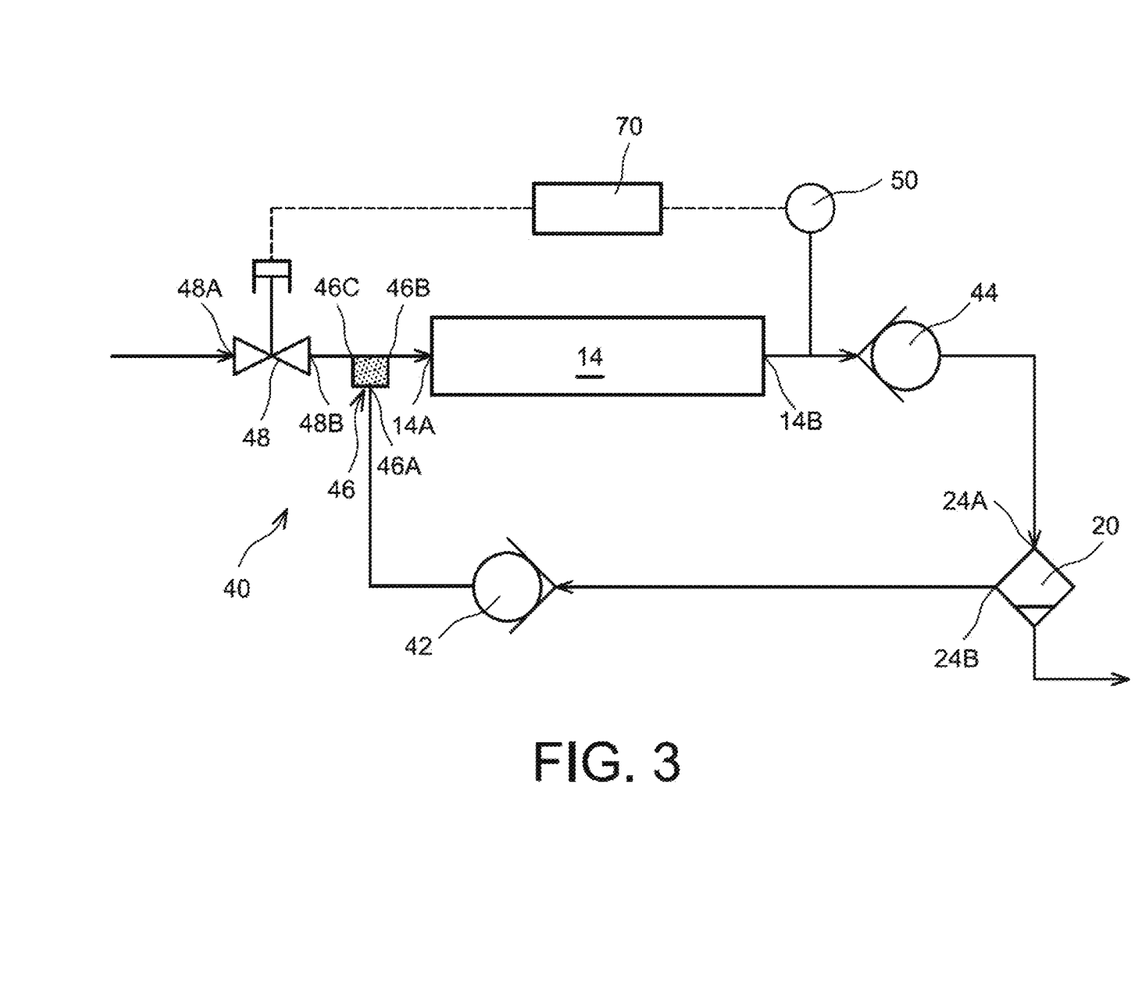
FIG. 3 represents an exemplary embodiment of the invention connected with an anodic compartment of a hydrogen cell.

According to a first exemplary embodiment of the invention, the outlet 14B and the inlet 14A of an anodic compartment 14 of a hydrogen electrochemical cell 2 (or battery), are connected, outside the compartment, through a purging circuit 40 (FIG. 3). The phrase "elements connected" according to the present application means that a fluid can flow between both these elements via the purging circuit.

The purging circuit can for example comprise one or more channels proof to the fluid flowing therein. The purging circuit includes means 20 forming a volume for containing hydrogen and/or a recovery gas (these means are designated by the term "capacitor" herein below) a first inlet 24A of which is intended to be connected to the outlet 14B of the anodic compartment 14, and a first outlet 24B of which is intended to be connected to the inlet 14A of the same compartment. The circuit can be connected to gas supply means, which are not represented in the figures; the gas provided by these supply means is preferably a gas having a very strong concentration of hydrogen, higher than 99%. In the case where hydrogen is mixed with another gas, this other gas can be nitrogen, and/or carbon dioxide, and/or methane.

A first nonreturn valve 42 is disposed downstream of the outlet 24B (in a gas flow direction in the purging circuit) and is intended to be connected to the inlet 14A so as to allow a fluid to be flown only from the capacitor 20 to an input of the anodic compartment 14.

A second nonreturn valve 44 is connected upstream (in a gas flow direction, from the anodic compartment to the capacitor 20) of the first inlet 24A of the capacitor, and is intended to be connected to the outlet 14B of the anodic compartment, so as to allow a fluid to be flown only from this outlet 14B to the capacitor. In other words, the first nonreturn valve 42 does not allow the fluid to be flown into the purging circuit 40, from the anodic compartment 14 to the capacitor 20. And the second nonreturn valve does not allow the fluid to be flown from the capacitor 20 to the anodic compartment 14. The nonreturn valves can be identical and are for example of the bellow, ball or concentric disc type.

The purging circuit includes means 46 that will allow a gas to be inflown into the anodic compartment 14. According to one example, these means include a connector 46 with three branches, a first branch 46A of which is intended to be connected to the first nonreturn valve 42, a second branch 46B of which is intended to be connected to the inlet 14A of the anodic compartment and a third branch 46C of which is intended to be connected to an outlet 48B of a two-way valve 48, for example a solenoid valve. The inlet 48A of this valve can be connected to a pressurised hydrogen supply device (not represented).

A pressure sensor 50 measures the pressure in the purging circuit 40, for example between the outlet 14B of the anodic compartment and the second nonreturn valve 44. The pressure measurement can be performed in any point of the purging circuit. A valve 48, for example a solenoid valve or a driven "on-off" valve is controlled by the pressure measurements thus performed. More precisely, when the pressure sensor detects a pressure, for example at the outlet of the anodic compartment, that is higher than a threshold value, called a maximum pressure threshold VB, the valve 48 is closed. And then, when the pressure measurement becomes lower than a threshold value, called a minimum pressure threshold VA, the valve 48 is open.

The valve 48 can be controlled by means 70, for example a microcomputer or a microprocessor, specifically programmed therefor, or an automatic controller. The value of the minimum pressure threshold VA and the value of the maximum pressure threshold VB depend on the membrane and the pressure at the cathode. Preferably, VA and VB are chosen such that the pressure remains in an admissible differential pressure range between the anode and the cathode, in order to avoid a risk of mechanical degradation of the membrane due to too high a differential pressure with the cathode.

Now, the operation of the purging circuit 40 above will be described. This is connected to the inlet and the outlet of the anodic compartment of a hydrogen cell as mentioned previously.

Upon operating the hydrogen cell, the valve 48 and the 2 valves 42, 44 being in the closed state, the hydrogen amount present in the anodic compartment 14 decreases because of the hydrogen oxidation at the anode and the migration of ions oxidised in the cathodic compartment through the membrane 8.

When the pressure difference between the capacitor 20 and the anodic compartment 14 is higher than the set pressure of the first nonreturn valve 42, this is opened, the valve 44 remaining closed. The capacitor 20 thereby contains a gas, for example pressurised hydrogen, wherein the proportion of inert gas, in particular of nitrogen, can reach 80% therein. This gas is called a recovery gas (see herein below) and will flow to the input of the anodic compartment 14.

The pressure in the capacitor 20 (which, generally, is related, or results from, the change over time in the pressure measured) and in the anodic compartment 14 will decrease because of the hydrogen consumption in the latter. When this pressure reaches the lower value VA, which is detected by the sensor 50, the valve 48 is open. The pressure increases in the anodic compartment 14, which results in the nonreturn valve 42 being closed, the valve 44 being still closed.

Then, the pressure difference between the anodic compartment 14 and the capacitor 20 results in opening the nonreturn valve 44 (because of the higher pressure in the anodic compartment 14), the valve 42 remaining closed. Then, the water and gas present in the anodic compartment 14 can be discharged to the capacitor 20. Indeed, it is then a pressure front which is propagated, for a duration of, for example, a few tenths of a second or a few seconds, for example between 0.1 s and 0.5 s, from the solenoid valve 48 to the capacitor 20, through the anodic compartment 14. This pressure front is very efficient for discharging water and gases (including hydrogen but also possibly at least one inert gas, in particular nitrogen), from the compartment 14 to the capacitor 20.

When the pressure of the anodic compartment reaches the maximum pressure threshold VB, the valve 48 is closed. The hydrogen pressure then begins to decrease in the anodic compartment 14, which results in closing the valve 44, the valve 42 remaining closed. The cycle above can then begin again.

The valves 42, 44 undergo the following cycle:
valve 42 closed, valve 44 closed (hydrogen consumption phase in the anodic compartment);
valve 42 open, valve 44 closed (recovery gas introduction into the anodic compartment);
valve 42 closed, valve 44 closed (hydrogen introduction into the anodic compartment);
valve 42 closed, valve 44 open (recovery gas introduction into the capacitor 20);
valve 42 closed, valve 44 closed (back to the initial state).

In other words, in the example set forth, each state of the purging circuit in which one of the valves is open is preceded and followed by a state in which both valves are closed.

Figure 4:
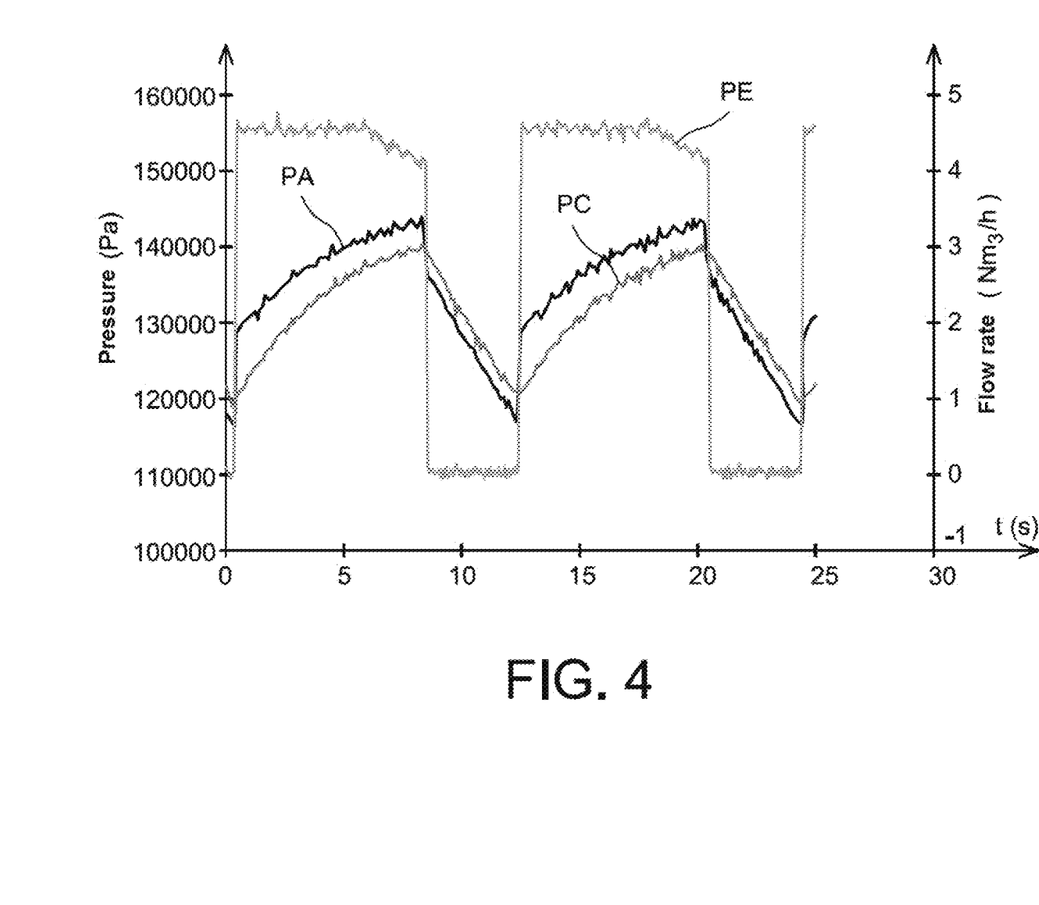
FIG. 4 represents the variation of pressure and flow rate of a fluid flowing in a device represented in FIG. 3 as a function of time (t).

FIG. 4 represents several purging cycles as described above, made from a purging circuit 40 connected to a hydrogen cell comprising 70 anodic compartments. More precisely, the hydrogen cell considered herein includes an active surface area of 200 cm$^2$, the internal volume of the capacitor 20 is 12 l, the total volume of the anodic compartments is 0.25 l, the measurements are performed at a temperature of 343 Kelvin and an altitude of 150 m. The hydrogen cell produces an intensity of 60 A, that is a ratio of 0.30 A/cm$^2$ of active surface area; the stœchiometry at the cathode is $\lambda c=3$ (there are three times more oxygen than necessary). The measurements performed relate to pressures PA measured by the pressure sensor 50, pressure variations PC measured in the capacitor 20 and flow rate variations PE measured at the outlet 48B of the solenoid valve 48 (FIG. 4).

FIG. 4 shows that upon opening the solenoid valve 48 (at 0 second), a hydrogen flow rate PE, at a flow rate of 4.5 Nm$^3$/h, is injected at the inlet of the anodic compartments. The hydrogen pressure in these compartments increases, which enables said compartments and the capacitor to be filled with hydrogen (PA and PC, 0<t<8 seconds). It is worth noting that the pressure in the capacitor is lower than the pressure in the anodic compartments, because of the presence of the second nonreturn valve 44 between the inlet 24A of the capacitor and the outlets of the anodic compartments. It is observed that the valve 48 is closed when the pressure in the anodic compartments is higher than 1.42 bar (t=8 seconds). According to this exemplary embodiment, this pressure corresponds to the maximum pressure threshold VB defined above. The pressure in the anodic compartments PA then drops because of the hydrogen consumption by the cell (8<t<13 seconds). It is worth noting that when the pressure of the anodic compartments comes below the pressure PE measured in the capacitor, both these pressures linearly lower, because the first nonreturn valve 42 is open. The pressure then lowers in both these enclosures down to a minimum threshold value (1.15 bar) measured by the pressure sensor 50, again triggering opening the valve 48 (at t=13 s). The hydrogen flow rate abruptly increases, creating a pressure front, closing the first nonreturn valve 42 and opening the second nonreturn valve 44. It can be noticed in FIG. 4 that the pressure increase is instantaneous in the anodic compartments and in the capacitor when the solenoid valve is open. This clearly shows that the pressure front is propagated extremely quickly through the anodic compartments to reach the capacitor 20. The pressure front enables water and gases present in the anodic compartments to be homogeneously discharged.

In comparison with a depressurisation technique as disclosed in document EP1018774A1, the use of a pressure front enables water and inert gases which are in the compartment 14 to be more readily driven. Indeed, this pressure front enables a denser atmosphere to be made in the compartment, because the pressure therein is consequently higher.

Again, the anodic compartments and the capacitor are filled with hydrogen (13<t<20 seconds). The time interval between two successive openings of the valve 48 can define a purging cycle according to the invention, it is for example in the order of 13 seconds according to the present example.

More generally, in a circuit according to the invention, the time interval between two successive openings of the inlet valve 48 can be between 5 s and 20 s.

Now, several alternatives of the purging circuit will be described below.

The alternatives can be combined together to form other exemplary embodiments of the invention.

Figure 5:
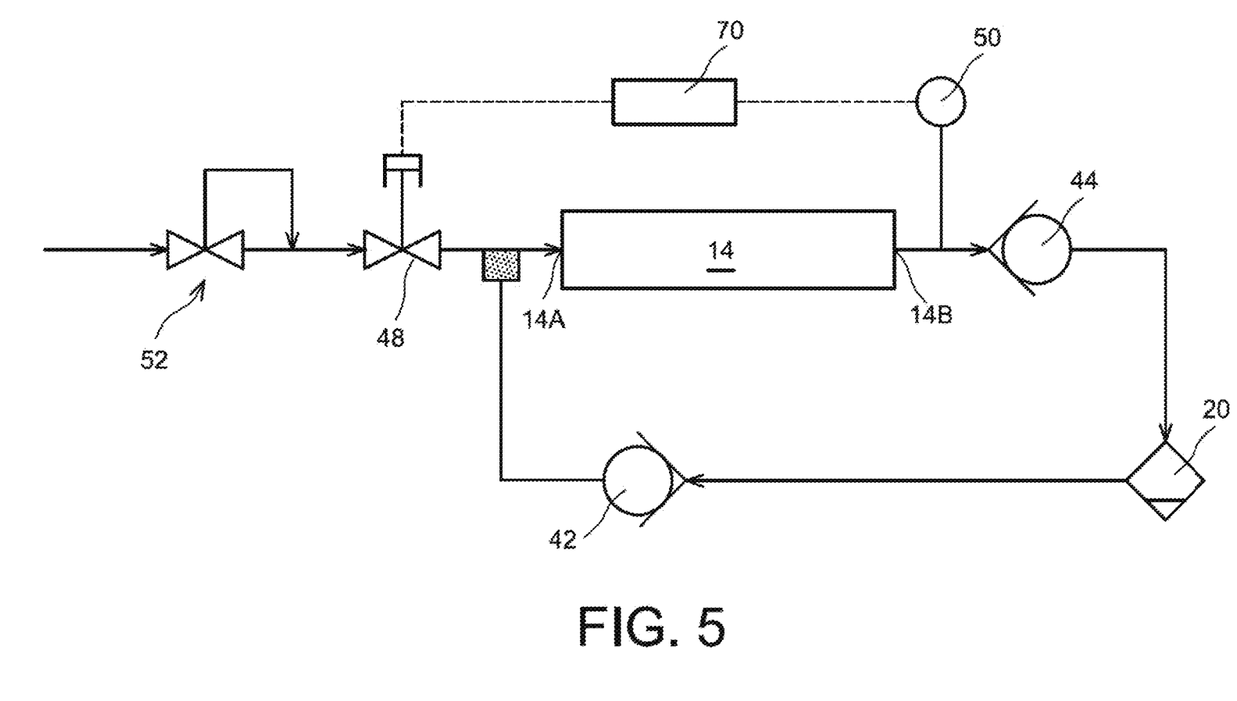
FIG. 5 represents a variant of the exemplary embodiment represented in FIG. 3.

According to a first alternative, a pressure reducer 52 is connected between the inlet 48A of the solenoid valve 48 and the pressurised hydrogen supply device (FIG. 5).

Advantageously, the pressure reducer enables the pressure in the anodic compartment to be limited while affording high gas flow rates.

According to a second alternative, the capacitor 20 includes a second outlet 24C, enabling liquid state water 54 present in said capacitor (FIG. 6) to be discharged. The capacitor can have an internal volume that can be for example between 500 ml and 22 l. It is worth noting that the time of a purging cycle varies in particular as a function of the available internal volume 56 in the capacitor. The terms "available internal volume" define a volume likely to be filled with a gas, preferably a pressurised gas. The higher the available internal volume, the longer the purging cycle. The capacitor 20 can include means for measuring the water volume 54 present in the internal volume, as for example a floater and/or means for detecting the presence of water controlling a second valve 58, for example a solenoid valve, connected to the second outlet 24C of the capacitor, so as to discharge at least part of the water 54 to outside said capacitor.

Figure 6:
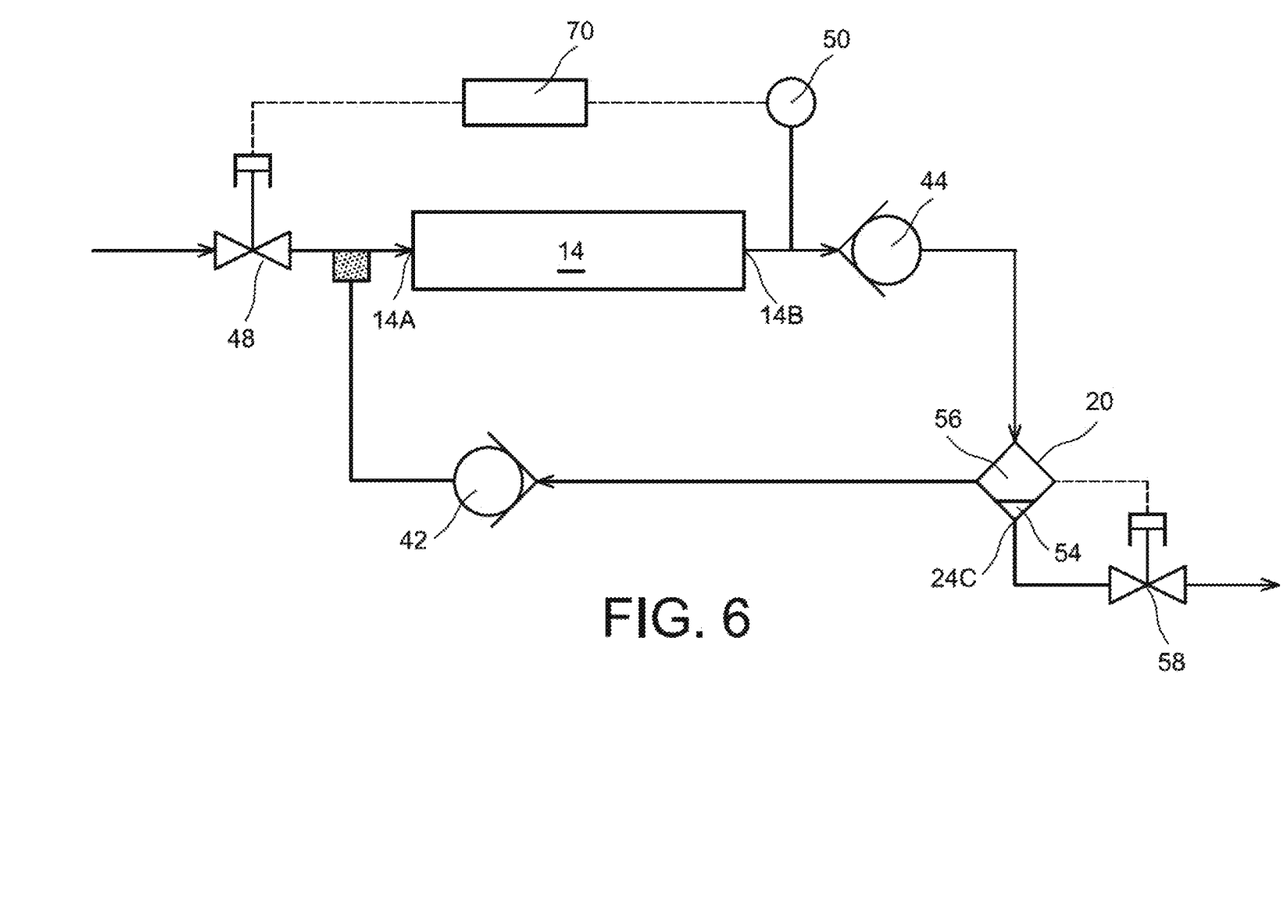
FIG. 6 represents another variant of the exemplary embodiment represented in FIG. 3.

Alternatively, the operation of the second solenoid valve 58 can be controlled through a device (not represented) measuring the frequency of the purging cycles. The frequency of the purging cycles increases in proportion to the water volume 54 contained in the capacitor. Thus, beyond a threshold frequency of the purging cycles, predetermined as a function of the internal volume of the capacitor, opening the second valve 58 can be controlled by the device measuring said frequencies. For example, a tachometer measures the frequency of the opening and closing cycle of the valve 48. When this frequency comes to a high threshold level (which means that the volume 56 has reached an admissible minimum threshold, below which it is not desired that it decreases), the control, which can be made by an automatic controller, or a microcontroller or a computer opens the valve 58 which purges part or all of the water present in the recuperator 20. This discharge increases the volume 56 which has the effect to lower the frequency of the opening and closing cycles of the valve 48. When this frequency, measured by the tachometer, comes under a low threshold, this means that the water volume 54 has reached an admissible target minimum value. The valve 58 is then closed.

The second valve 58 enables the frequency of the purging cycles to be modified at will by controlling the water volume 54 present in the capacitor. The devices above also enable only the water present in the liquid state of the capacitor to be discharged, without releasing the hydrogen or recovery gas present in the available internal volume 56 into the environment.

According to a third alternative, the purging circuit 40 can include a second pressure sensor measuring the pressure in the cathodic compartment, or upstream or downstream thereof, so as to know the pressure difference between the anodic compartment 14 and the cathodic compartment 16. The solenoid valve 48 can be open or closed also as a function of the pressure difference between both these compartments, so as to avoid too high mechanical biases of the membrane likely to damage it. Using both these sensors, a differential measurement between the anodic compartment and the cathodic compartment is made. The solenoid valve 48 is open in order to change over time the pressure measured by the sensor 50 such that the differential pressure between the anode and the cathode reaches a first threshold, called a high saturation threshold. When this first threshold is reached, opening the means 48 supplying the anodic compartment is commanded. The differential pressure between the anode and the cathode drops until a second threshold, called a low saturation threshold, is reached, controlling reopening the means 48.

According to a fourth alternative, the set pressures of the nonreturn valves 42 and 44 are as low as possible, so as to be able to use at best the pressure variations afforded by the membrane 8. Each of these set pressures is for example between 5 mbar and 50 mbar.

In the embodiments and examples described above, the pressure sensor is disposed so as to measure the pressure between the outlet of the anodic compartment and the second nonreturn valve 44. However, alternatively, the pressure measurement can be made at any place of the gas line. For example, it can be made between the nonreturn valves, or even in the tank 20. The operation described above remains the same. Further, all the alternatives described above are applicable.

In conclusion, the present application is concerned with a reflow circuit enabling hydrogen, outflowing from an anodic compartment, to be reintroduced into this compartment.

The outlet of an anodic compartment is connected to the inlet on the purging circuit, the outlet of which joins the inlet of the anodic compartment. The reflow circuit advantageously includes a capacitor 20, the available internal volume 56 of which can be controlled by purging liquid water 54 present in said capacitor. In this way, the frequency of the purging cycles can be controlled.

The durations of the different steps of a purging cycle can be set by a relationship between the cell current, the internal volume of the capacitor and the volume of the anodic compartment, the pressure thresholds for opening and closing the valve and the set pressure of the nonreturn valves. In particular:

the higher the current and the more hydrogen is consumed, and thus the quicker the pressure drops and the longer the pressure to be increased again;
the higher the volumes, the longer their filling and emptying durations;
the closer both thresholds, and the more quickly they are reached, and the shorter the cycle;
the greater the set pressure, and less often the valves will be open; this will shorten the cycle time.

On the other hand, the volume of liquid water 54 contained in the capacitor 20 can be known as a function of the frequency of the purging cycles: hence, the purging of water from the capacitor 20 can be made without releasing hydrogen in to the environment. Opening and closing the second solenoid valve 58 can be controlled so as to discharge an amount of liquid water equal to or lower than the liquid water present in the capacitor. Thereby, it is possible to limit hydrogen losses upon purging the capacitor.

The invention also enables the mechanical deformations exerted on the membrane 8 to be controlled during purging cycles: the frequency of these cycles can be advantageously adapted so as not to degrade irreversibly the mechanical properties of the membrane.

Another advantage related to the invention is that it is not necessary to utilise compressor or pump type devices to flow hydrogen in the purging circuit 40. Therefore, the invention offers the advantage not to cause an energy extra cost since the purging circuit 40 does not have a pump. Hence, the cell performance is less affected by the pressure variations in the anodic compartment due to the purging circuit, the cell weight is decreased and its overall space is diminished in comparison with a present circuit comprising a compressor.

What is claimed is:

1. A purging circuit for purging an anodic compartment of an electrochemical cell of a fuel cell, this circuit including:
   a volume, having connexity, of at least equal to 300 ml, capable of containing and homogenising a recovery gas comprising hydrogen and an inert gas, said volume comprising a first inlet and a first outlet;
   a first nonreturn valve connected to the first outlet of said volume for containing a recovery gas so as to prevent a gas from being introduced into said volume through the first outlet and to allow a part of a gas to be flown, from the first outlet to an inlet of the anodic compartment;
   a second nonreturn valve connected to the first inlet of said volume for containing a recovery gas, so as to prevent a gas from being discharged, from said volume, through the first inlet;
   a pressure sensor able to measure at least one of the pressure of a fluid present in said circuit and a pressure between an outlet of said anodic compartment and the second nonreturn valve;
   a valve having an inlet and an outlet and allowing a supply gas to be flown or prohibiting it from being flown to said inlet of the anodic compartment, as a function of pressure data from said pressure sensor and allowing recovery gas to be flown, from the first nonreturn valve to the inlet of the anodic compartment;
   wherein, in response to changes in pressure within the purging circuit, the first nonreturn valve and the second nonreturn valve are configured to alternate between a state in which both the first nonreturn valve and the second nonreturn valve are closed and a state wherein one of the first nonreturn valve and the second nonreturn valve is open.

2. The purging circuit according to claim 1, further comprising a connector comprising a first branch connected to the first nonreturn valve, a second branch and a third branch, said valve allowing a supply gas to be flown to the inlet of said anodic compartment being connected to the third branch of the connector.

3. The purging circuit according to claim 2, the inlet of said anodic compartment being connected to the second branch of said connector, so as to allow a gas outflowing from the anodic compartment to be reintroduced into said anodic compartment through the purging circuit.

4. The purging circuit according to claim 1, said valve allowing a supply gas to be flown or prohibiting it from being flown to the inlet of said anodic compartment:
   allowing a supply gas to be flown to the inlet of said anodic compartment, to increase the pressure therein or when the pressure sensor measures a pressure lower than a minimum threshold, or when a pressure measured by said pressure sensor increases;
   not allowing a supply gas to be flown to the inlet of said anodic compartment, to decrease the pressure therein or when the pressure sensor measures a pressure higher than a maximum threshold, which is higher than the minimum threshold pressure or when the pressure measured by said pressure sensor decreases.

5. The purging circuit according to claim 1, a pressure reducer being connected upstream of the inlet of the valve allowing a gas to be flown or prohibiting it from being flown to the inlet of said anodic compartment.

6. The purging circuit according to claim 1, said volume for containing a recovery gas including a second outlet for discharging at least part of a liquid state water present in said volume.

7. The purging circuit according to claim 6, further including a sensor measuring the volume of the liquid water present in said volume for containing a recovery gas.

8. The purging circuit according to claim 6, including a valve or a solenoid valve controlling said second outlet.

9. The purging circuit according to claim 8, including means for measuring the frequency of purging cycles and for controlling the operation of said valve controlling said second outlet as a function of this frequency.

10. The purging circuit according to claim 8, said valve for controlling said second outlet allowing this to be controlled without releasing in the environment a recovery gas present in said volume for containing a recovery gas.

11. The purging circuit according to claim 1, further including a second pressure sensor measuring the pressure in a cathodic compartment belonging to the same electrochemical cell as said anodic compartment.

12. The purging circuit according to claim 11, said valve, allowing a supply gas to be flown or prohibiting it from being flown to the inlet of said anodic compartment, as a function of pressure data of said pressure sensor, being controlled as a function of the pressure difference between the anodic compartment and the cathodic compartment.

13. The purging circuit according to claim 1, connecting several outlets and several inlets of several anodic compartments belonging to a fuel cell comprising several electrochemical cells.

14. The purging circuit according to claim 1, further including a device for supplying a pressurized fuel comprising hydrogen.

15. A purging circuit for purging an anodic compartment of an electrochemical cell of a fuel cell, this circuit including:
   a volume, having connexity, of at least equal to 300 ml, capable of containing and homogenising a recovery gas comprising hydrogen and an inert gas, said volume comprising a first inlet and a first outlet;
   a first nonreturn valve connected to the first outlet of said volume for containing a recovery gas so as to prevent a gas from being introduced into said volume through the first outlet and to allow a part of a gas to be flown, from the first outlet to an inlet of the anodic compartment;
   a second nonreturn valve connected to the first inlet of said volume for containing a recovery gas, so as to prevent a gas from being discharged, from said volume, through the first inlet;
   a pressure sensor able to measure at least one of the pressure of a fluid present in said circuit and a pressure between an outlet of said anodic compartment and the second nonreturn valve;
   means allowing a supply gas to be flown or prohibiting it from being flown to the inlet of said anodic compartment, as a function of pressure data from said pressure sensor and allowing recovery gas to be flown, from the first nonreturn valve to the inlet of the anodic compartment;
   wherein, in response to changes in pressure within the purging circuit, the first nonreturn valve and the second nonreturn valve are configured to alternate between a state in which both the first nonreturn valve and the second nonreturn valve are closed and a state wherein one of the first nonreturn valve and the second nonreturn valve is open.

16. The purging circuit of claim 1, wherein the first nonreturn valve and the second nonreturn valve are configured such that
   when a pressure in the anodic compartment increases, the first nonreturn valve is closed and the second nonreturn valve is closed;
   when a pressure difference between the anodic compartment and a capacitor changes, the first nonreturn valve is closed and the second nonreturn valve is opened;
   where a pressure in the anodic compartment decreases, the first nonreturn valve is closed and the second nonreturn valve is closed; and
   when the pressure difference between the anodic compartment and a capacitor changes, the first nonreturn valve is opened and the second nonreturn valve is closed.

17. The purging circuit of claim 15, wherein the first nonreturn valve and the second nonreturn valve are configured such that
   when a pressure in the anodic compartment increases, the first nonreturn valve is closed and the second nonreturn valve is closed;
   when a pressure difference between the anodic compartment and a capacitor changes, the first nonreturn valve is closed and the second nonreturn valve is opened;
   where a pressure in the anodic compartment decreases, the first nonreturn valve is closed and the second nonreturn valve is closed; and when the pressure difference between the anodic compartment and a capacitor changes, the first nonreturn valve is opened and the second nonreturn valve is closed.

18. The purging circuit of claim 1 further comprising a computer, processor or controller to control the opening and closing of the first nonreturn valve and the second nonreturn valve.

\* \* \* \* \*